(12) United States Patent
Mori et al.

(10) Patent No.: US 8,978,809 B2
(45) Date of Patent: Mar. 17, 2015

(54) SADDLE-RIDE VEHICLE

(71) Applicant: Honda Motor Co., Ltd., Tokyo (JP)

(72) Inventors: Yotaro Mori, Wako (JP); Kineo Tomura, Wako (JP); Zentaro Katsuno, Wako (JP)

(73) Assignee: Honda Motor Co., Ltd., Tokyo (JP)

( * ) Notice: Subject to any disclaimer, the term of this patent is extended or adjusted under 35 U.S.C. 154(b) by 0 days.

(21) Appl. No.: 14/226,820

(22) Filed: Mar. 27, 2014

(65) Prior Publication Data

US 2014/0291960 A1 Oct. 2, 2014

(30) Foreign Application Priority Data

Mar. 29, 2013 (JP) ................................. 2013-075295

(51) Int. Cl.
*B62K 21/00* (2006.01)
*B62J 99/00* (2009.01)

(52) U.S. Cl.
CPC ............ *B62K 21/00* (2013.01); *B62J 2099/002* (2013.01)
USPC ....................................................... 180/219

(58) Field of Classification Search
CPC .... B62K 21/00; B62D 15/02; B62J 2099/002
USPC ............................. 180/219; 280/279; 324/723
See application file for complete search history.

(56) References Cited

U.S. PATENT DOCUMENTS

2009/0302557 A1* 12/2009 Hara et al. ................. 280/5.512
2010/0270773 A1* 10/2010 Miyashiro et al. ............ 280/272

FOREIGN PATENT DOCUMENTS

JP 2009-184419 8/2009

* cited by examiner

*Primary Examiner* — Anne Marie Boehler
*Assistant Examiner* — Felicia L Brittman
(74) *Attorney, Agent, or Firm* — Mori & Ward, LLP (57) ABSTRACT

A saddle-ride vehicle includes a steering shaft, a head pipe, a main frame, a top bridge and a bottom bridge, an upper end bearing and a lower end bearing, a potentiometer, a bracket, and a thread nut. The steering shaft has a shaft axis. The head pipe supports the steering shaft to be rotatable around the shaft axis. The main frame extends from the head pipe toward a rear side of a vehicle body. The top bridge and the bottom bridge are fixed to upper and lower ends of the steering shaft, respectively. The upper end bearing and the lower end bearing are provided inside the head pipe at upper and lower ends of the head pipe, respectively to support the steering shaft rotatably. The potentiometer includes a cable and is configured to output an electric signal in accordance with a pullout amount of the cable.

9 Claims, 7 Drawing Sheets

SADDLE-RIDE VEHICLE

CROSS-REFERENCE TO RELATED APPLICATIONS

The present application claims priority under 35 U. S. C. §119 to Japanese Patent Application No. 2013-075295, filed Mar. 29, 2013, entitled "Saddle-Ride-Type Vehicle." The contents of this application are incorporated herein by reference in their entirety.

BACKGROUND OF THE INVENTION

1. Field of the Invention

The present invention relates to a saddle-ride vehicle.

2. Discussion of the Background

Generally, a steering angle sensor is provided in a lower end portion, on an axis, of a steering shaft. Japanese Unexamined Patent Application Publication No. 2009-184419 discloses an example in which a steering angle sensor is provided in front forks which support a front wheel. Specifically, the front forks include a steering stem which is turnably attached to a head pipe constituting a front end of a vehicle body frame, and a bridge which is attached to a lower end portion of the steering stem. The steering angle sensor is provided at a bottom portion of the bridge.

SUMMARY OF THE INVENTION

According to one aspect of the present invention, a saddle-ride vehicle includes a steering shaft, a head pipe, a main frame, a top bridge and a bottom bridge, an upper end bearing and a lower end bearing, a potentiometer, a bracket, and a thread nut. The steering shaft has a shaft axis. The head pipe supports the steering shaft to be rotatable around the shaft axis. The main frame extends from the head pipe toward a rear side of a vehicle body. The top bridge and the bottom bridge are fixed to upper and lower ends of the steering shaft, respectively. The upper end bearing and the lower end bearing are provided inside the head pipe at upper and lower ends of the head pipe, respectively to support the steering shaft rotatably. The potentiometer includes a cable and is configured to output an electric signal in accordance with a pullout amount of the cable. The bracket is provided in the main frame at a connection portion with the head pipe to support the potentiometer. The thread nut is provided between the upper end bearing and the top bridge to abut on the upper end bearing and is screwed to the steering shaft. The thread nut includes a nut main body part, a plurality of engagement grooves, and a plurality of projection parts. The nut main body part includes a guide part to guide the cable to be wound up. The plurality of engagement grooves are provided in an outer circumference portion to engage with a jig. The plurality of projection parts extend in a radial direction from the nut main body part. Each of the plurality of projection parts includes a cable connecting part via which the cable is connected to the thread nut.

BRIEF DESCRIPTION OF THE DRAWINGS

A more complete appreciation of the invention and many of the attendant advantages thereof will be readily obtained as the same becomes better understood by reference to the following detailed description when considered in connection with the accompanying drawings.

DESCRIPTION OF THE EMBODIMENTS

The embodiments will now be described with reference to the accompanying drawings, wherein like reference numerals designate corresponding or identical elements throughout the various drawings.

Hereinafter, a saddle-ride-type vehicle according to the embodiment of the present invention will be described in detail with reference to the attached drawings.

Figure 1:
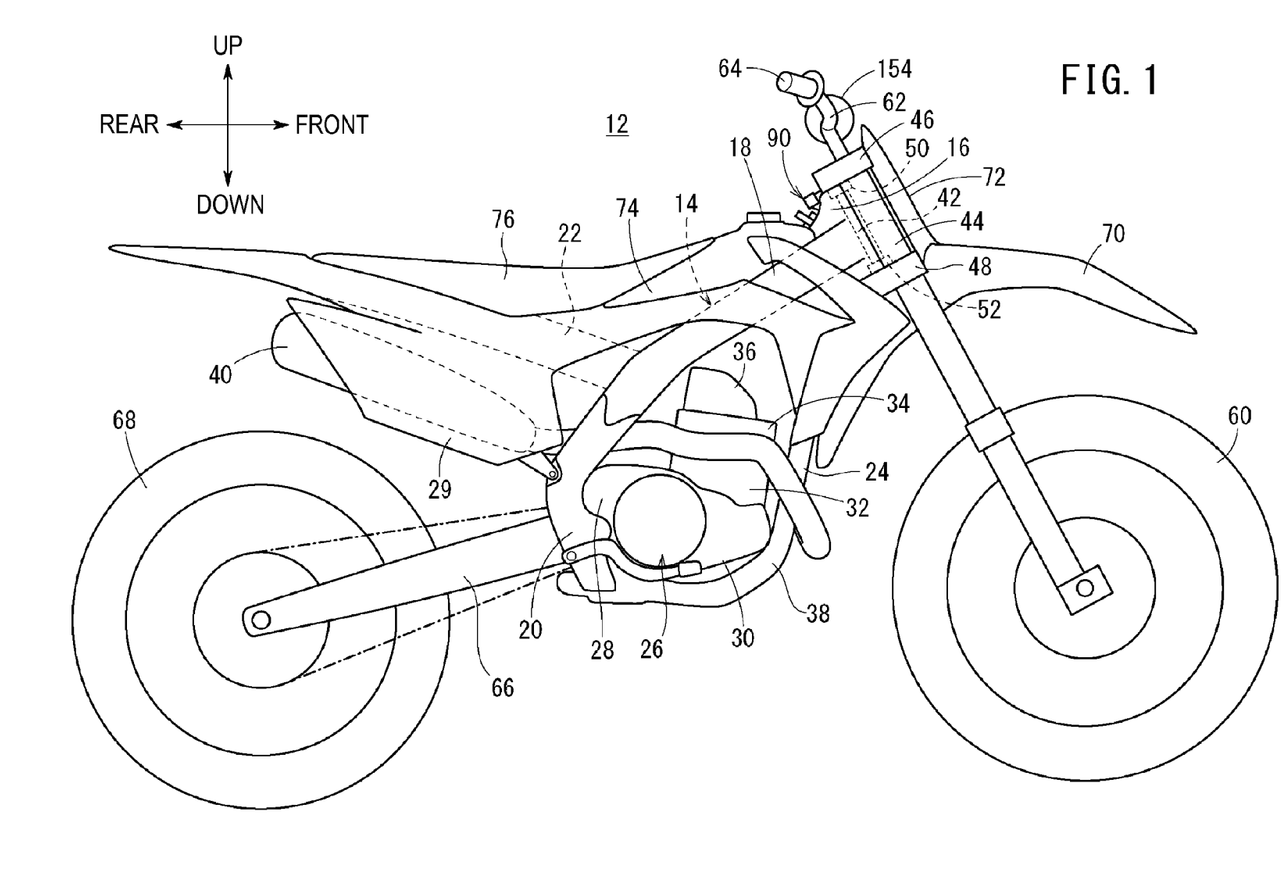
FIG. 1 is a right-side view illustrating a state where a steering angle sensor is attached to a saddle-ride-type vehicle according to a present embodiment.

FIG. 1 is a right-side view of a motorcycle 12 (vehicle body) as a saddle-ride-type vehicle according to the present embodiment. Note that, for easy understanding of the embodiment of the present invention, front-rear and up-down directions are described using arrow directions illustrated in FIG. 1 as the reference as long as any special instruction is given, and left-right directions are described using a direction seen from a vehicle driver seated in a vehicle body as the reference.

The motorcycle 12 includes, as illustrated in FIG. 1, a vehicle body frame 14 which constitutes a vehicle body, and the vehicle body frame 14 includes a head pipe 16 which is provided at a front end thereof, a main frame 18 which extends rearward and slant downward from the head pipe 16, a pivot plate 20 which is connected to a rear end portion of the main frame 18, a seat frame 22 which is connected to an intermediate portion of the main frame 18 and extends rearward and upward, and a down frame 24 which extends rearward and downward from the head pipe 16, below the main frame 18. An engine 26 and a transmission 28 which is integrally attached to a rear portion of the engine 26 are attached to the main frame 18, the pivot plate 20, and the down frame 24. Moreover, the motorcycle 12 is attached with a rear cowl 29 which extends rearward together with the seat frame 22 and covers both side surfaces and a lower surface of the seat frame 22.

The engine 26 is a single cylinder engine, and includes a crankcase 30, a cylinder block 32 which is attached to a front upper portion of the crankcase 30, a cylinder head 34 which is attached to an upper end portion of the cylinder block 32, and a cylinder head cover 36 which covers an upper opening of the cylinder head 34. The cylinder head 34 is connected with a muffler 40 via an exhaust pipe 38.

Moreover, the motorcycle 12 includes a steering shaft 42 which is supported in the head pipe 16, a pair of front forks 44 which are disposed in left and right sides of the head pipe 16 being separated from each other, a top bridge 46 which connects respective upper portions of the pair of front forks 44, and a bottom bridge 48 which connects respective central portions of the pair of front forks 44.

Figure 2:
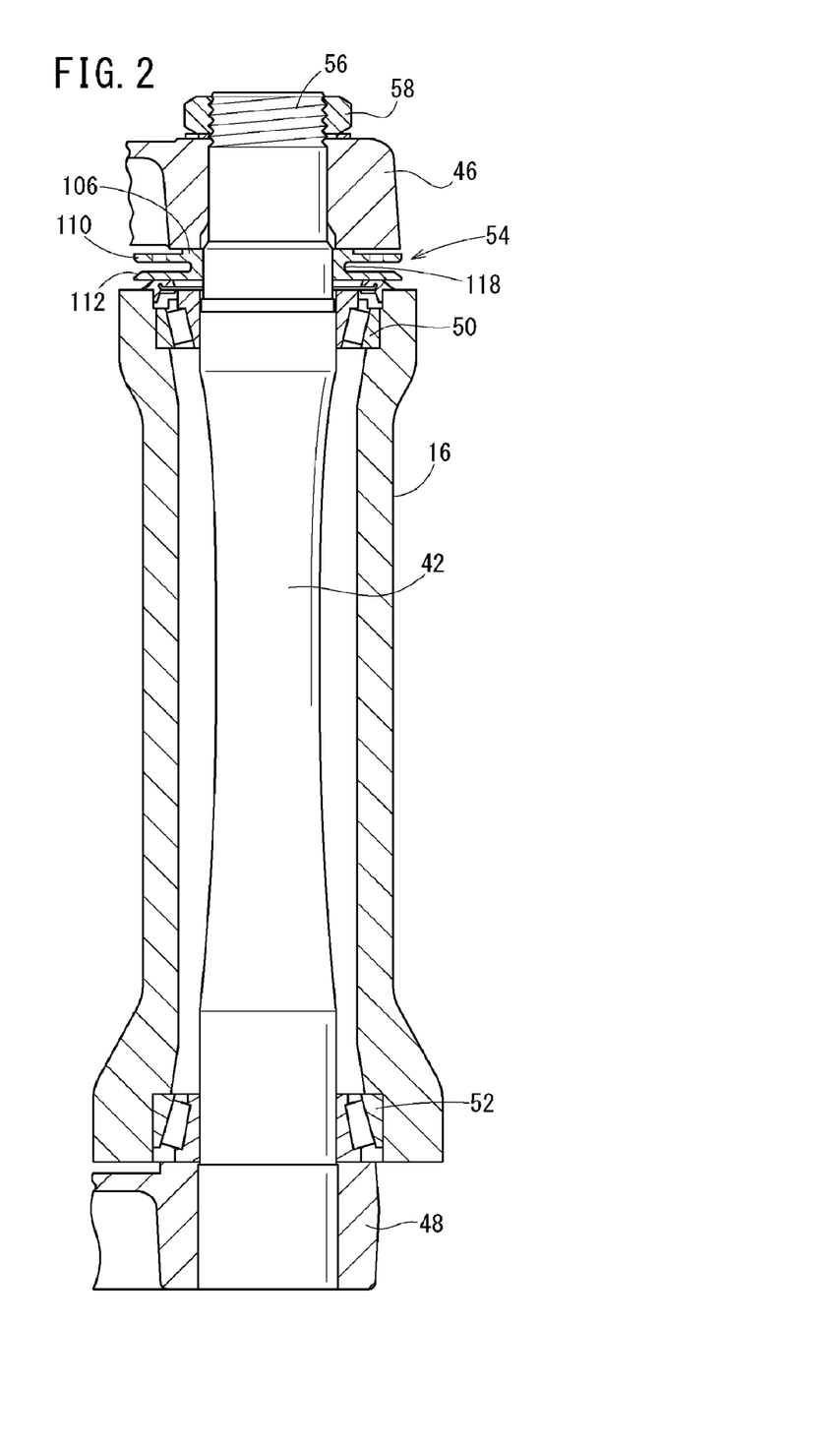
FIG. 2 is a cross-sectional view illustrating a positional relation among a head pipe, a steering shaft, and a thread nut.

The steering shaft 42 is supported rotationally movable relative to the head pipe 16 by an upper end bearing 50 and a lower end bearing 52 which are respectively fixed an upper end portion and a lower end portion of the head pipe 16, as illustrated in FIG. 2. Moreover, an upper end portion and a lower end portion of the steering shaft 42 are respectively fixed to the top bridge 46 and the bottom bridge 48. In addition, a thread nut 54 which abuts on the upper end bearing 50 and is screwed to the steering shaft 42 is included between the upper end bearing 50 and the top bridge 46. A lower surface of the lower end bearing 52 is abutted on the bottom bridge 48. Accordingly, tightening the thread nut 54 allows loads to the upper end bearing 50 and the lower end bearing 52 to be adjusted. Note that, a nut 58 is screwed into a groove 56 formed on the upper portion of the steering shaft 42 which protrudes from an upper surface of the top bridge 46.

The motorcycle 12 includes, as illustrated in FIG. 1, a front wheel 60 as a steering wheel which is pivotally supported by the pair of left and right front forks 44 in a rotatable manner, a handle 64 (steering) which is fixed to an upper portion of the top bridge 46 via a pair of fixing members 62, a pair of left and right swing arms 66 which are supported by the pivot plate 20 in a swingable manner, and a rear wheel 68 which is pivotally supported by rear end portions of the pair of left and right swing arms 66 in a rotatable manner. A front fender 70 is attached to a position above and away from the front wheel 60. A front cover 72 which covers the head pipe 16 and the like is attached to an upper portion of the front fender 70. A fuel tank 74 is provided above the engine 26. A seat 76 is disposed on the rear of the fuel tank 74.

Figure 3:
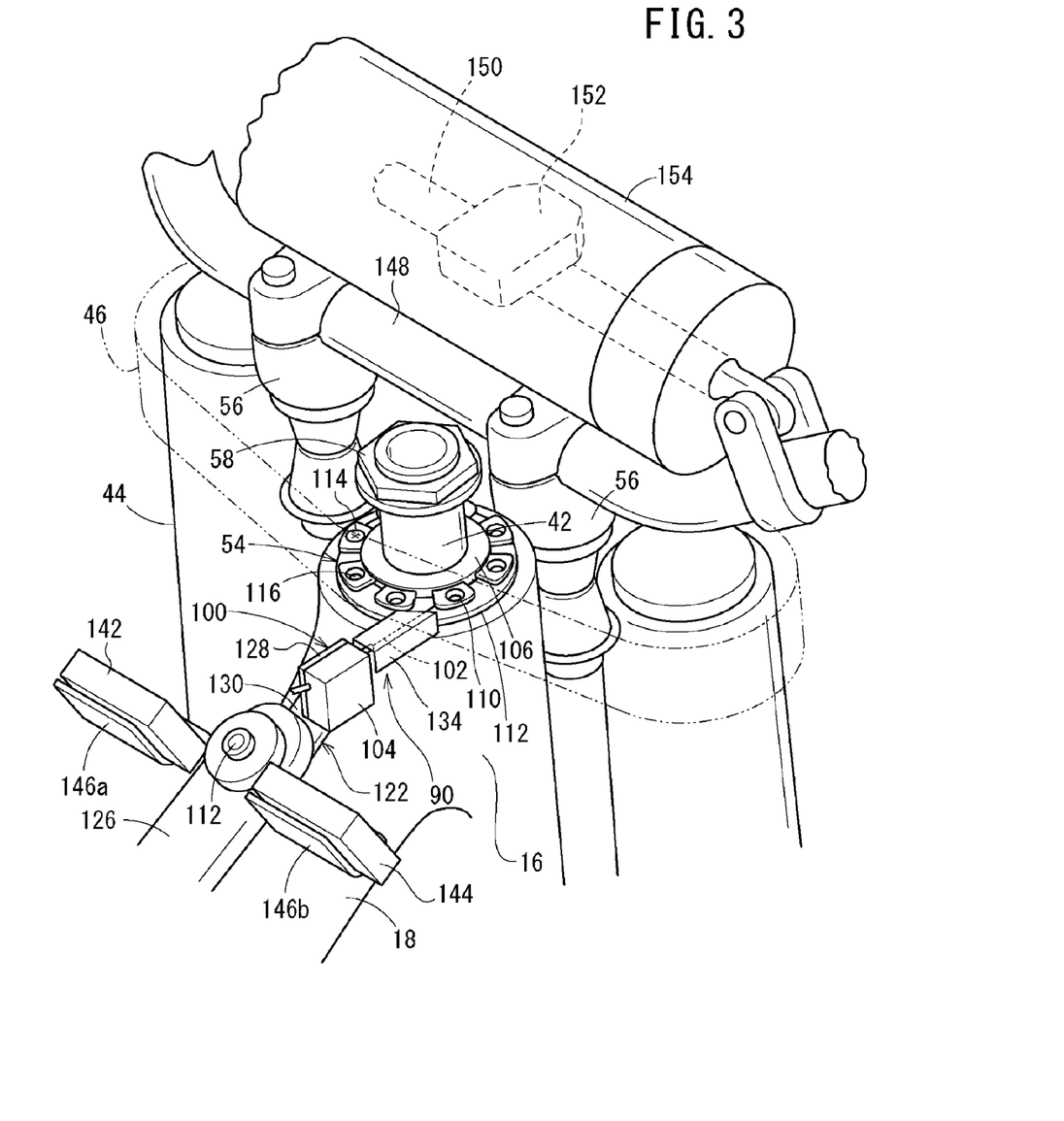
FIG. 3 is a perspective view illustrating an attachment state of the steering angle sensor to the saddle-ride-type vehicle in a partially omitted manner.
Figure 4:
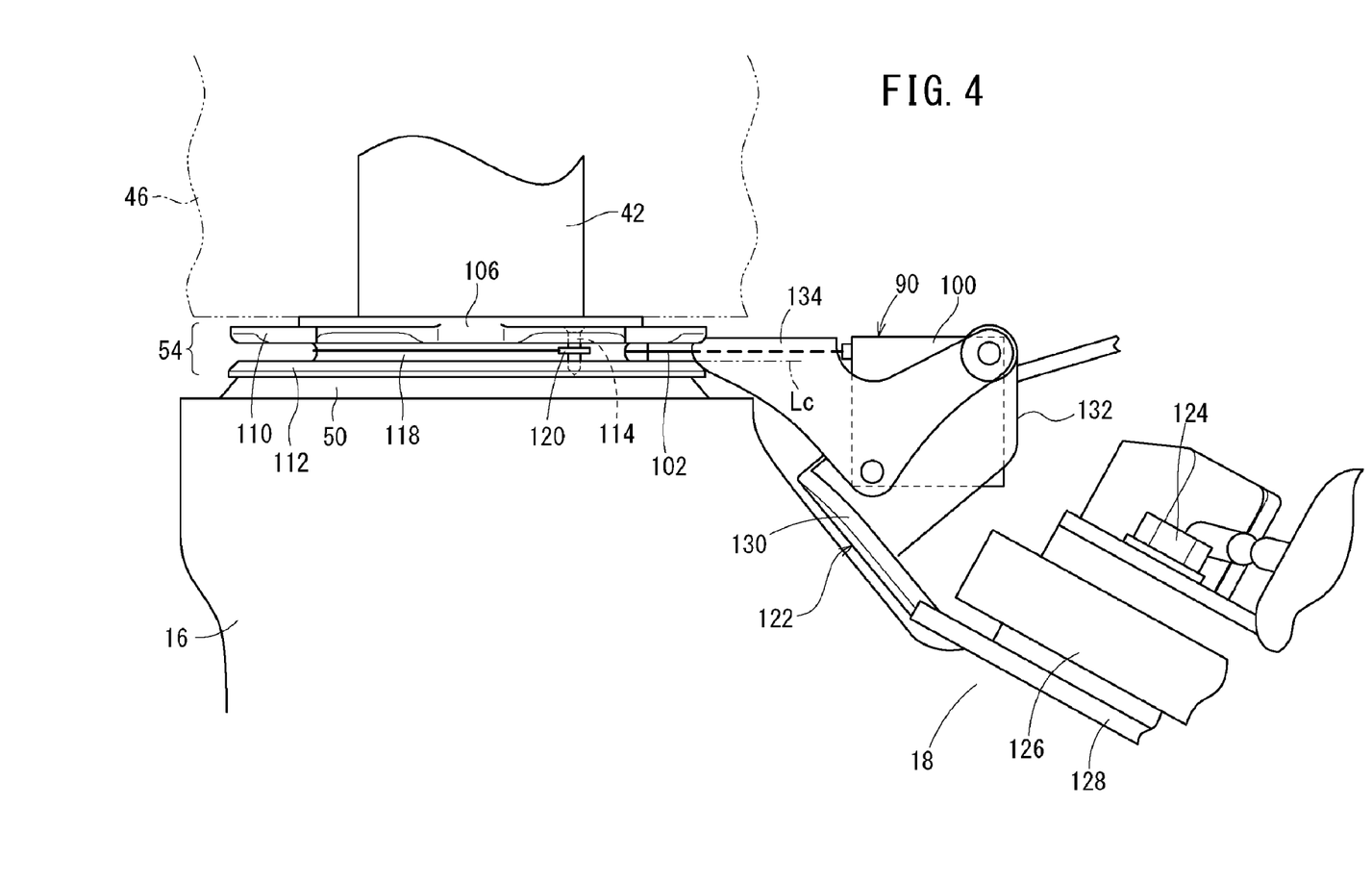
FIG. 4 is a side view illustrating the attachment state of the steering angle sensor in a partially omitted manner.

Further, as illustrated in FIG. 3 and FIG. 4, the saddle-ride-type vehicle according to the present embodiment is devised so as to attach a steering angle sensor 90 to the thread nut 54.

Firstly, the steering angle sensor 90 includes a potentiometer 100, and the potentiometer 100 outputs an electric signal (voltage signal, current signal) at a level in accordance with the pullout amount of a cable 102. The cable 102 is always urged in a direction of a housing 104 by a spring member installed in the housing 104.

Generally, the thread nut 54 includes a nut main body part 106 which is screwed to the steering shaft 42, multiple engagement grooves 108 (see FIG. 6) for engaging a jig which are formed in an outer circumference portion of the nut main body part 106, and multiple projection parts 110 which extend in the radial direction from an upper portion of the nut main body part 106. Accordingly, the thread nut 54 has a petal-like shape in a top view.

Therefore, in the present embodiment, provided is a flange part 112 which extends in the radial direction from a bottom portion of the nut main body part 106 and abuts on the upper end bearing 50. Further, each of the projection parts 110 is provided with a through-hole 116 into which a screw 114 is inserted. In the nut main body part 106, a small-diameter portion sandwiched between the flange part 112 and the multiple projection parts 110 functions as a guide part 118 around which the cable 102 is wound up.

Figure 5:
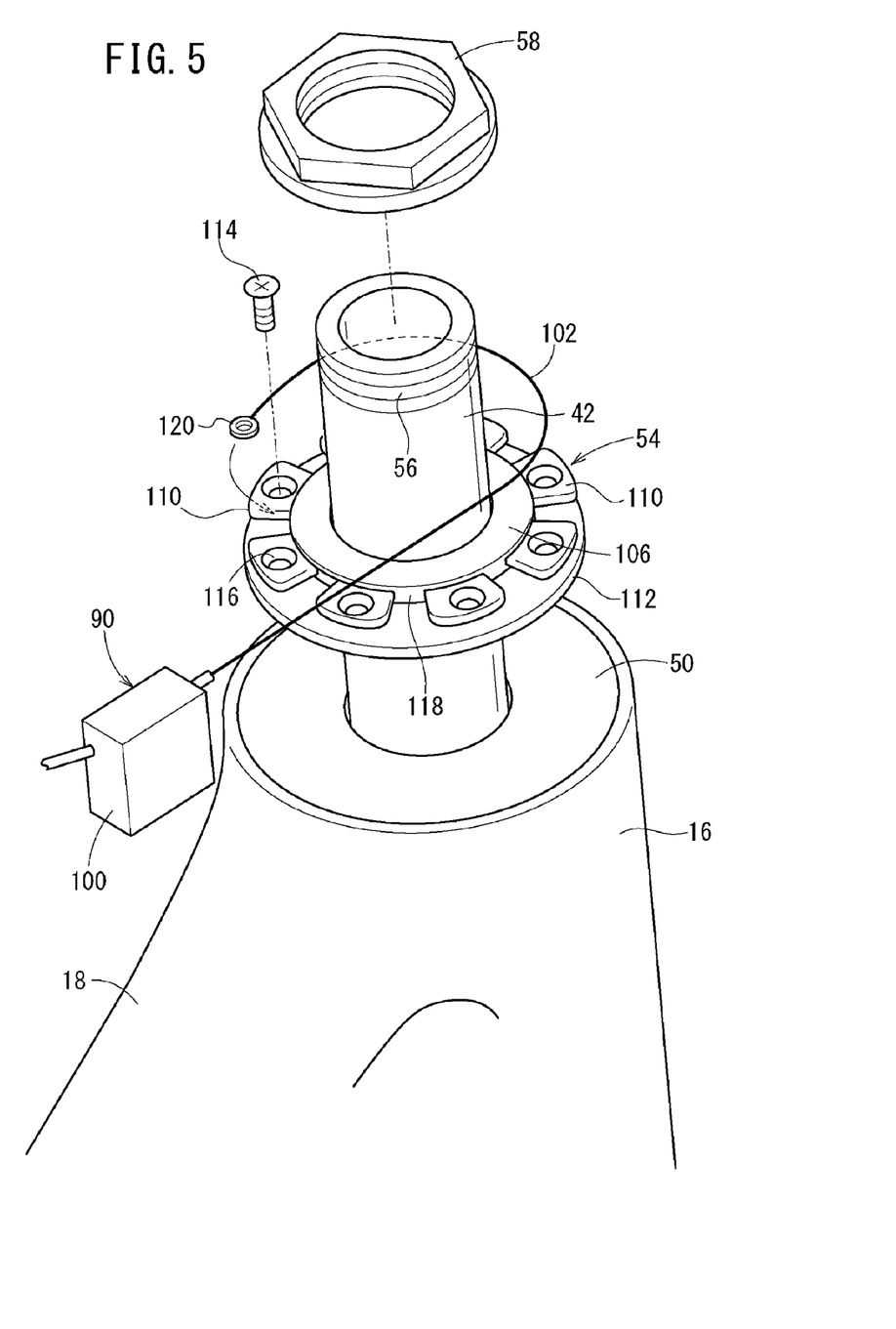
FIG. 5 is an explanation view illustrating the attachment state of the steering angle sensor, specifically a method of fixing a tip of a cable, in a partially omitted manner.

Meanwhile, as illustrated in FIG. 5, a ring member 120 into which the screw 114 is inserted is fixed to an end portion of the cable 102 extended from the potentiometer 100. Accordingly, a tip of the cable 102 can be fixed to the thread nut 54 such that the end portion of the cable 102 is positioned to one arbitrarily projection part 110 selected among the multiple projection parts 110, and in such a state, the screw 114 is screwed into the flange part 112 through the through-hole 116 of the selected projection part 110 and the ring member 120 of the cable 102. In other words, each of the through-holes 116 of the multiple projection parts 110 provided in the thread nut 54 functions as a cable fixing part.

In addition, a bracket 122 for fixing the potentiometer 100 is fastened to the motorcycle 12. The bracket 122 is formed, as illustrated in FIG. 4, such that a plate member made of a metal is bent, for example, and is fastened to the main frame 18 at a portion downwardly slanted from a connection portion with the head pipe 16 toward the rear side. In other words, the bracket 122 integrally includes a plate-shaped fixing part 128 which is fastened to the main frame 18 by being screwed together with a tank support part 126 by a bolt 124, a plate-shaped extension part 130 which extends from the fixing part 128 toward an upper end of the head pipe 16, and a plate-shaped side plate part 132 which stands upright from a side portion of the extension part 130. The potentiometer 100 is removably supported on a right side surface of the side plate part 132. Moreover, a protection cover member 134 for protecting the cable 102 pulled out from the potentiometer 100 is rotatably attached to a left side surface of the side plate part 132. The protection cover member 134 covers the cable 102 from one side to the other side over the cable 102.

In this manner, with the saddle-ride-type vehicle according to the present embodiment, the rotational movement (steering angle) of the handle 64 can be measured by simply preparing the thread nut 54 with the projection parts 110 and the nut main body part 106 which are processed, and attaching the potentiometer 100 which is removably supported on a vehicle body thereto. In other words, no dedicated part is necessary to be provided on the steering shaft 42, only a small change is required even in a case of a design change of the potentiometer 100, and the potentiometer 100 is easy to be installed as an external device, thereby making it possible to suppress an increase in the cost and an increase in the number of parts.

When only one projection part 110 among the multiple projection parts 110 provided in the thread nut 54 is functioned as the cable fixing part, fastening the thread nut 54 results in change of an attached position of the cable 102. In contrast, in the present embodiment, each of the multiple projection parts 110 can function as the cable fixing part to allow the attached position to be selected. Accordingly, versatility can be achieved. In this case, the projection parts 110 are disposed at equal intervals to allow the tip of the cable 102 to be easily fixed to a position in accordance with the length of the cable 102.

Moreover, the thread nut 54 includes the multiple projection parts 110 which extend in the radial direction from the upper portion of the nut main body part 106, and the flange part 112 which extends in the radial direction from the bottom portion the nut main body part 106. Accordingly, the multiple projection parts 110 and the flange part 112 can constitute the guide part 118 which guides winding up of the cable 102. In other words, the guide part 118 is not necessary to be provided as a separate member because the multiple projection parts 110 are also used as members for constituting the guide part 118, thereby making it possible to suppress an increase in the number of parts.

The cable 102 pulled out from the potentiometer 100 is always urged in the direction of the housing 104 by the spring member installed in the housing 104. In other words, the cable 102 is wound up by the spring member. Therefore, the potentiometer 100 can measure a steering angle by following the rotational movement of the handle 64.

Moreover, in the present embodiment, the bracket 122 to which the potentiometer 100 is fixed is fixed to the main frame 18 by being screwed together with the tank support part 126 by the bolt 124. In this case, the potentiometer 100 is attached to the main frame 18 using the tank support part 126. This enables the potentiometer 100 to be held without requiring a redundant attachment part.

Here, a preferable attachment method of the potentiometer 100 will be described also with reference to FIG. 6.

Figure 6:
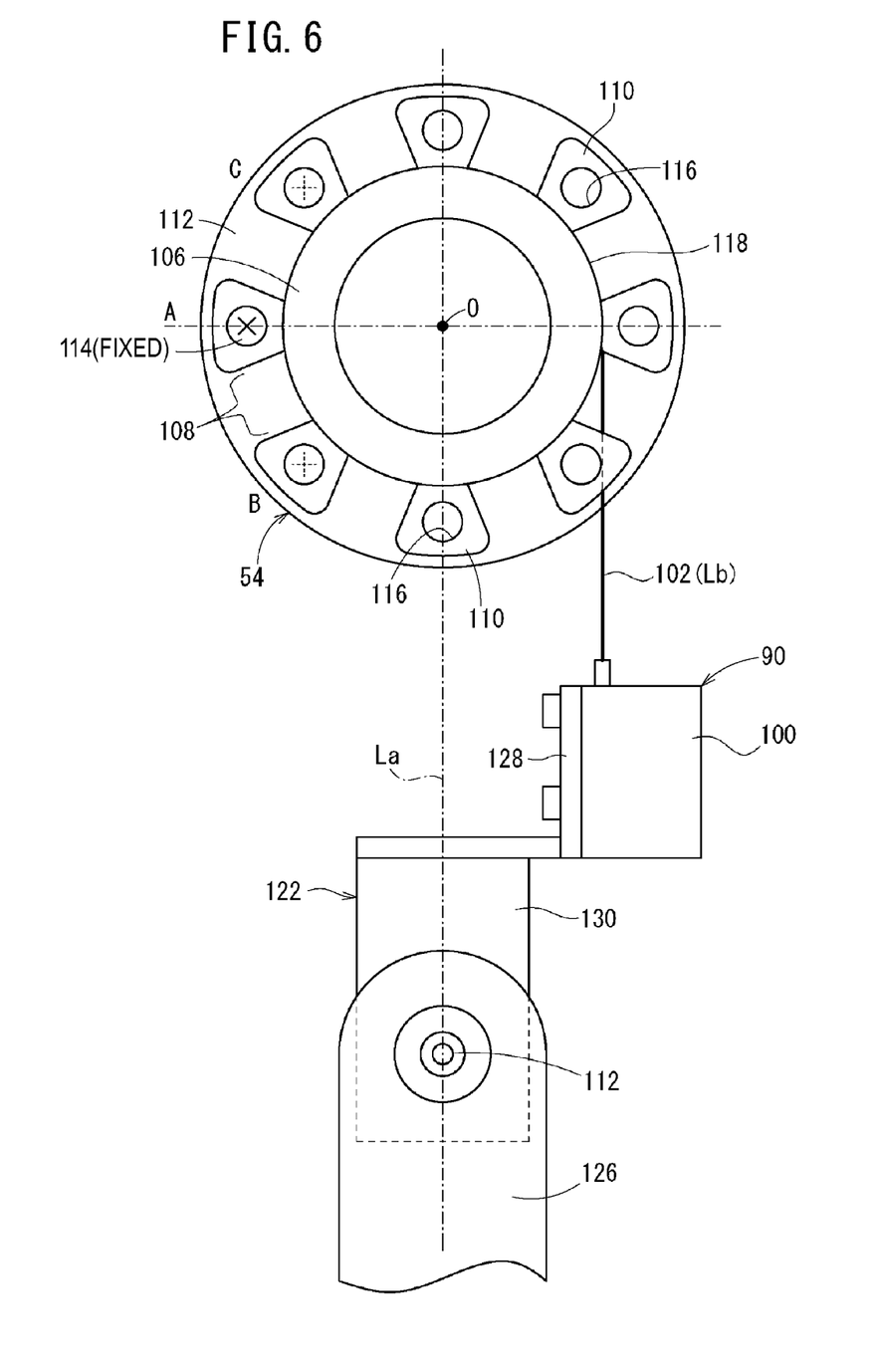
FIG. 6 is an explanation view illustrating a relation among a center line of a vehicle body, an extension line in a tangential direction at one side of a guide part, and an extension direction of the cable, and a relation between a rotation center of the thread nut and a fixed position of the cable.

Firstly, the potentiometer 100 is preferably attached to the bracket 122 (see FIG. 4) such that the cable 102 is positioned so as to extend in parallel with a center line La of the vehicle body in both cases in a top view and in a side view, as illustrated in FIG. 6. Specifically, as illustrated in FIG. 6, the cable 102 extended from the potentiometer 100 is positioned on an extension line Lb in a tangential direction at one side (right side) of the guide part 118 in a top view. In addition, as illustrated in FIG. 4, the cable 102 extended from the potentiometer 100 is positioned so as to be in parallel with an extension line Lc (extension line indicating the same height) of the guide part 118 of the thread nut 54 in a side view.

This allows a tension (pullout) of the cable 102 from the potentiometer 100 and a return thereof to the potentiometer 100 to easily follow the rotational movement of the handle 64, thereby making it possible to implement a low friction with respect to the tension or the return of the cable 102.

Moreover, the potentiometer 100 is disposed, as illustrated in FIG. 6, at one side (for example, right side) relative to the center line La of the vehicle body, and the handle 64 is in a straight ahead state (position at which the front wheel 60 directs forward), the cable 102 is fixed to the other side (for example, left side) relative to the center line La through the front side of the thread nut 54. This allows the pullout or the return of the cable 102 to easily follow the rotational movement in both directions of the handle 64, thereby making it possible to detect the steering angle with high accuracy.

Moreover, when only one projection part 110 among the multiple projection parts 110 provided in the thread nut 54 is functioned as the cable fixing part, fastening the thread nut 54 results in change of an attached position of the cable 102. In contrast, in the present embodiment, the through-holes 116 are respectively provided in the multiple projection parts 110 (all the projection parts 110 in FIG. 6) to cause the multiple projection parts 110 to function as the cable fixing parts. In addition to a projection part 110 located at a "A" position of FIG. 6, for example, a projection part 110 (a projection part 110 located at a "B" position or a projection part 110 located at a "C" position) located before and after the projection part 110 located at the "A" position or the like can be also selected as the attached position. Accordingly, versatility can be achieved.

In addition, in the present embodiment, the potentiometer 100 is attached such that when the handle 64 is fully turned to one side (for example, right side) relative to the center line La of the vehicle body, the projection part 110 which supports the cable 102 is not positioned at least at the one side across the center line La of the vehicle body. This allows the cable 102 to always come into contact with the guide part 118 in the entire movable range of the potentiometer 100 (range of the cable being pulled out and returned), thereby enabling the cable 102 to smoothly be pulled out and returned using the guide part 118.

Note that, as illustrated in FIG. 6, when the potentiometer 100 is installed in a position at the right side of a vehicle body, only the multiple projection parts 110 positioned at the left side may respectively function as the cable fixing parts. Needless to say, all the projection parts 110 are functioned as the cable fixing parts to allow the potentiometer 100 to be installed at the left side as well as the right side, of the vehicle body. Accordingly, versatility can be achieved.

In the foregoing, although the attachment method of the steering angle sensor 90 is explained, various kinds of sensors as well as the steering angle sensor 90 may be attached to the motorcycle 12.

Figure 7:
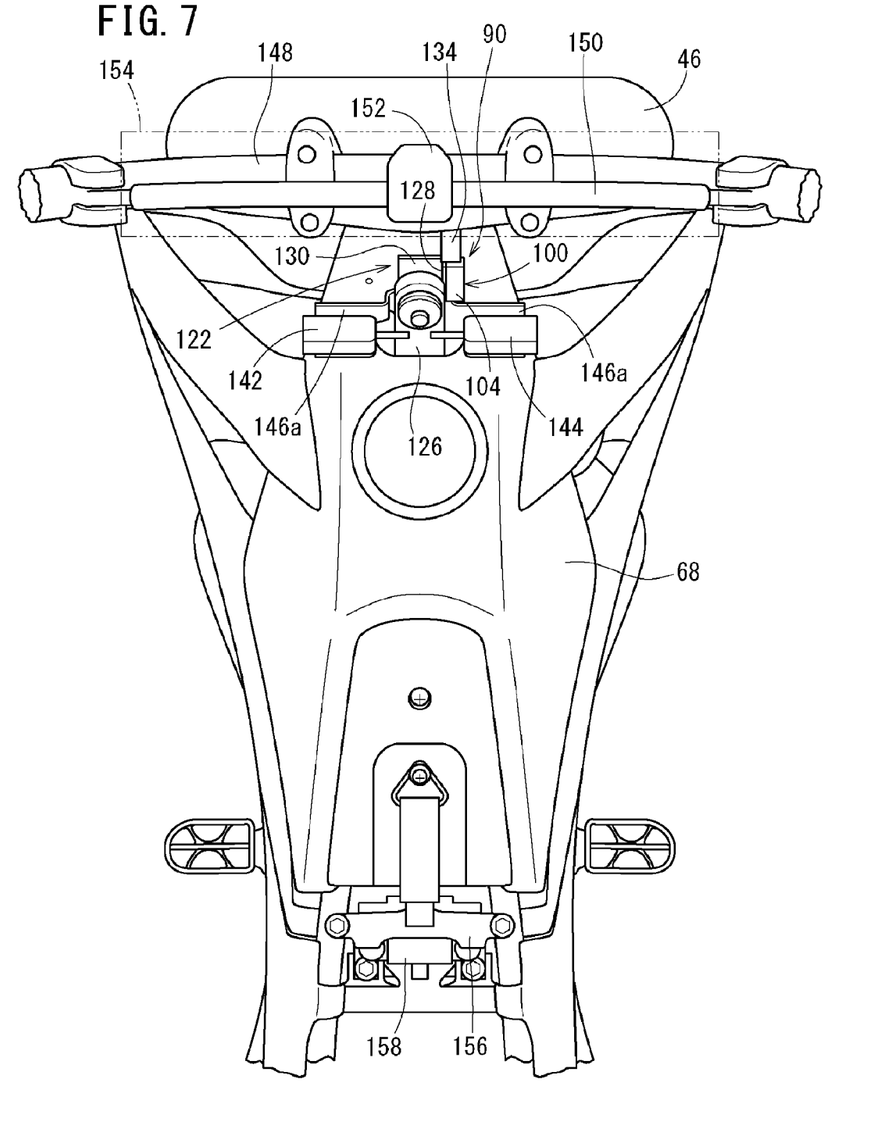
FIG. 7 is a plan view illustrating an example of attached positions of the steering angle sensor, a lap sensor, a section sensor, a GPS sensor, and a gyro sensor.

For example, as illustrated in FIG. 3 and FIG. 7, a lap sensor 142 (sensor which measures a lap time) and a section sensor 144, in addition to the potentiometer 100, are attached to the bracket 122 to which the potentiometer 100 is fixed. For example, the bracket 122 is provided with a left-side attachment part 146a and a right-side attachment part 146b which respectively extend in left and right sides from the portion thereof fixed to the tank support part 126. For example, the lap sensor 142 is fixed to the left-side attachment part 146a, and the section sensor 144 is fixed to the right-side attachment part 146b. Accordingly, the bracket 122 which supports the steering angle sensor 90 is commonly used for the various sensors, thereby making it possible to suppress an increase in the cost and an increase in the number of parts.

Moreover, as illustrated in FIG. 3 and FIG. 7, a GPS sensor 152 may be provided on an attachment bar 150 which is rotatably stretched on an upper portion of a handle bar 148. A tubular cushion 154 is generally attached to the attachment bar 150, to cause the GPS sensor 152 to be hidden in the cushion 154.

In addition, as illustrated in FIG. 7, a gyro sensor 158 may be attached to a seat support stay 156 which supports and fixes the seat 76 (see FIG. 1). The seat support stay 156 is installed in a position at a nearly central portion of the vehicle body. Therefore, the gyro sensor 158 can detect the inclination with high accuracy during when the vehicle body is traveling.

Note that, the saddle-ride-type vehicle according to the embodiment of the present invention is not limited to the abovementioned embodiment, and is apparently able to employ various configurations without departing from the gist of the present invention.

The embodiment of the present invention involves the following aspects.

A first aspect of the embodiment of the present invention provides a saddle-ride-type vehicle including: a steering shaft (42); a head pipe (16) which supports the steering shaft (42) in a rotationally movable manner; a main frame (18) which extends from the head pipe (16) toward a rear side of a vehicle body (12); a top bridge (46) and a bottom bridge (48) which are respectively fixed to upper and lower ends of the steering shaft (42); an upper end bearing (50) and a lower end bearing (52) which support the steering shaft (42) in a rotationally movable manner inside upper and lower ends of the head pipe (16); and a thread nut (54) which abuts on the upper end bearing (50), is positioned between the upper end bearing (50) and the top bridge (46), and is screwed to the steering shaft (42), the thread nut (54) including a plurality of engagement grooves (108) for engaging a jig which are formed in an outer circumference portion thereof, and a plurality of projection parts (110) which extend in a radial direction from a nut main body part (106), in which the saddle-ride-type vehicle includes a bracket (122) which is provided in the main frame (18) at a connection portion with the head pipe (16), and removably fastens a potentiometer (100) for outputting an electric signal at a level in accordance with a pullout amount of a cable (102), each of the projection parts (110) of the thread nut (54) includes a cable fixing part which fixes the cable (102) extended from the potentiometer (100), and the nut main body part (106) of the thread nut (54) includes a guide part (118) which guides winding up of the cable (102).

A second aspect of the embodiment of the present invention provides the saddle-ride-type vehicle in which the projection parts (110) of the thread nut (54) extend in the radial direction from an upper portion of the nut main body part (106), the thread nut (54) further includes a flange part (112) which extends in the radial direction from a bottom portion of the nut main body part (106), and the projection parts (110) and the flange part (112) constitute the guide part (118).

A third aspect of the embodiment of the present invention provides the saddle-ride-type vehicle in which the potentiometer (100) is a winding-up type, and winds up the cable (102) by an urged force.

A fourth aspect of the embodiment of the present invention provides the saddle-ride-type vehicle in which the potentiometer (100) is disposed such that the cable (102) extends in parallel with a center line (La) of the vehicle body (12), is positioned on an extension line (Lb) in a tangential direction at one side of the guide part (118) in a top view, and is in parallel with an extension line (Lc) of the guide part (118) of the thread nut (54) in a side view.

A fifth of the embodiment of the present invention aspect provides the saddle-ride-type vehicle in which the potentiometer (100) is disposed at one side of the center line (La) of the vehicle body (12), and the cable (102) is fixed to the other side of the center line (La) through a front side of the thread nut (54) when a steering (64) is in a straight ahead state.

A sixth aspect of the embodiment of the present invention provides the saddle-ride-type vehicle in which the potentiometer (100) is attached such that when the steering (64) is fully turned to the one side of the center line (La) of the vehicle body (12), a fixed position of the cable (102) is not positioned at least at the one side across the center line (La) of the vehicle body (12).

A seventh aspect of the embodiment of the present invention provides the saddle-ride-type vehicle in which a cover member (134) which protects the cable (102) is supported by the bracket (122) which holds the potentiometer (100).

An eighth aspect of the embodiment of the present invention provides the saddle-ride-type vehicle in which the bracket (122) which holds the potentiometer (100) is fixed to the main frame (18) by being screwed together with a tank support part (126).

According to the first aspect of the embodiment of the present invention, the rotational movement (steering angle) of the handle can be measured by simply preparing the thread nut with the projection parts and the nut main body part which are processed, and attaching the potentiometer which is removably supported on a vehicle body thereto. In other words, no dedicated part is necessary to be provided on the steering shaft, only a small change is required even in a case of a design change of the potentiometer, and the potentiometer is easy to be installed as an external device, thereby making it possible to suppress an increase in the cost and an increase in the number of parts.

In addition, each of the multiple projection parts provided in the thread nut functions as the cable fixing part to allow an attached position of the cable of the potentiometer to be selected regardless of the individual difference in length thereof. Accordingly, versatility can be achieved.

According to the second aspect of the embodiment of the present invention, the guide part which guides winding up of the cable can be configured with a simple structure.

According to the third aspect of the embodiment of the present invention, the potentiometer of a winding-up type can measure a steering angle by following the rotational movement.

According to the fourth aspect of the embodiment of the present invention, a tension (pullout) of the cable from the potentiometer and a return thereof to the potentiometer are easy to follow the rotational movement of the steering, thereby making it possible to implement a low friction with respect to the tension or the return of the cable.

According to the fifth aspect of the embodiment of the present invention, the pullout or the return of the cable are easy to follow the rotational movement in both directions of the steering, thereby making it possible to detect the steering angle with high accuracy.

According to the sixth aspect of the embodiment of the present invention, the cable is allowed to always come into contact with the guide part in the entire movable range of the potentiometer (range of the cable being pulled out and returned), thereby enabling the cable to smoothly be pulled out and returned using the guide part.

According to the seventh aspect of the embodiment of the present invention, protection of the cable can be implemented although the cover member is retrofitted.

According to the eighth aspect of the embodiment of the present invention, the potentiometer is attached to the main frame using the tank support part. This enables the potentiometer to be held without requiring a redundant attachment part.

Obviously, numerous modifications and variations of the present invention are possible in light of the above teachings. It is therefore to be understood that within the scope of the appended claims, the invention may be practiced otherwise than as specifically described herein.

What is claimed is:
1. A saddle-ride vehicle comprising:
a steering shaft having a shaft axis;
a head pipe supporting the steering shaft to be rotatable around the shaft axis;
a main frame extending from the head pipe toward a rear side of a vehicle body;
a top bridge and a bottom bridge which are fixed to upper and lower ends of the steering shaft, respectively;
an upper end bearing and a lower end bearing provided inside the head pipe at upper and lower ends of the head pipe, respectively to support the steering shaft rotatably;
a potentiometer including a cable and configured to output an electric signal in accordance with a pullout amount of the cable;
a bracket provided in the main frame at a connection portion with the head pipe to support the potentiometer; and
a thread nut provided between the upper end bearing and the top bridge to abut on the upper end bearing and screwed to the steering shaft, the thread nut comprising:
a nut main body part including a guide part to guide the cable to be wound up;
a plurality of engagement grooves provided in an outer circumference portion to engage with a jig; and
a plurality of projection parts which extend in a radial direction from the nut main body part, each of the plurality of projection parts including a cable connecting part via which the cable is connected to the thread nut.

2. The saddle-ride vehicle according to claim 1, wherein
the plurality of projection parts of the thread nut extend in the radial direction from an upper portion of the nut main body part,
the thread nut further includes a flange part which extends in the radial direction from a bottom portion of the nut main body part, and the plurality of projection parts and the flange part constitute the guide part.

3. The saddle-ride vehicle according to claim 1, wherein the potentiometer is a winding-up potentiometer, and winds up the cable by an urged force.

4. The saddle-ride vehicle according to claim 1, wherein the potentiometer is disposed such that the cable extends in parallel with a center line of the vehicle body, is positioned on an extension line in a tangential direction at one side of the guide part in a top view, and is in parallel with an extension line of the guide part of the thread nut in a side view.

5. The saddle-ride vehicle according to claim 1, wherein the potentiometer is disposed at one side of a center line of the vehicle body, and the cable is connected to another side of the center line through a front side of the thread nut when a steering is in a straight ahead state.

6. The saddle-ride vehicle according to claim 5, wherein the potentiometer is attached such that when the steering is fully turned to the one side of the center line of the vehicle body, a connected position of the cable is not positioned at least at the one side across the center line of the vehicle body.

7. The saddle-ride vehicle according to claim 1, wherein a cover member which protects the cable is supported by the bracket which holds the potentiometer.

8. The saddle-ride vehicle according to claim 1, wherein the bracket which holds the potentiometer is connected to the main frame by being screwed together with a tank support part.

9. The saddle-ride vehicle according to claim 1, wherein one of the plurality of projection parts each of which includes the cable connecting part is to be selected to connect the cable to the cable connecting part.

\* \* \* \* \*